Patented Jan. 31, 1928.

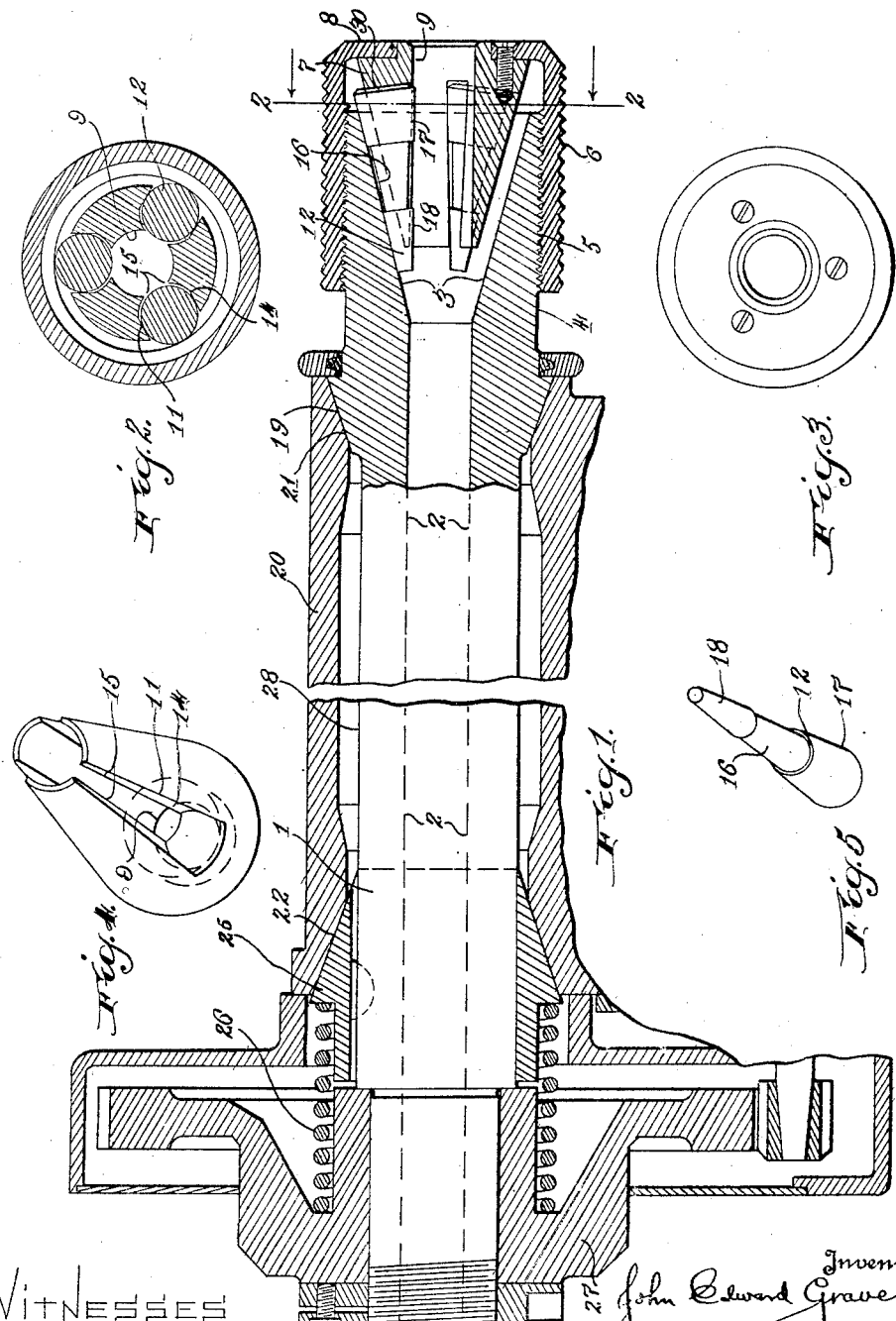

1,657,571

UNITED STATES PATENT OFFICE.

JOHN EDWARD GRAVES, OF BALTIMORE COUNTY, MARYLAND, ASSIGNOR TO THE BLACK AND DECKER MANUFACTURING COMPANY, OF TOWSON HEIGHTS, MARYLAND, A CORPORATION OF MARYLAND.

CHUCK.

Application filed June 15, 1927. Serial No. 198,883.

In the resurfacing or grinding of valves for internal combustion motors it is extremely difficult and important that they be so held that the axis of the valve is co-incident with the axis of rotation. In the reseating operation, if the valve surface is not concentric with the valve axis, perfect contact of the valve with the seat cannot be had and while a skilled workman using any commercial drill chuck may succeed in aligning the valve in each instance prior to grinding, the operation requires a considerable degree of skill and is expensive.

The object of the present invention is to produce a chuck for use in holding the valves in connection with a valve refacing machine and for other purposes, the chuck being so constructed as to produce an automatic alignment and centering of the valve stem with the axis of rotation, it being understood that the valve reseating machine to which reference is had is of the type in which the valve is rotated in contact with a rotary grinding wheel and at the same time is fed across the face of the wheel either by moving the spindle or wheel.

The chuck of the present invention is provided with tapered gripping rollers operated by a rotary carrier secured to the chuck nut or cap and forced inwardly to grip the spindle by means of a tapered internal accurately ground surface within the spindle or chuck body, having its axis in exact coincidence with the axis of the spindle. The chuck is preferably formed integrally with the ends of the spindle to avoid the loss of accuracy incident to mounting the chuck body on the usual taper.

In the accompanying drawings I have illustrated a chuck embodying the features of my invention in the preferred form.

In the drawings:

Figure 1 is a longitudinal central section.

Figure 2 is a section on the line 2—2 of Figure 1.

Figure 3 is an end view looking from the right in Figure 1.

Figure 4 is a perspective view of the frusto conical carrier removed.

Figure 5 is a corresponding view of one of the rollers.

Referring to the drawings by numerals, each of which is used to indicate the same or similar parts in the different figures, the spindle proper 1 is preferably bored centrally at 2 concentrically and in alignment with the axis and provided with an enlarged frusto conical ground opening or internal surface 3 at the chuck end 4, which end is also externally threaded at 5 to engage a correspondingly internally threaded cap or nut 6. A frusto conical carrier 7 is secured to the cap 6 which is flanged at its outer end at 8 for this purpose. The cap 6 is shown knurled, the chuck being hand operated.

The conical carrier 7 is of an angle corresponding to the angle of the internal frusto conical surface 3 and extends into the opening formed thereby. It is also centrally apertured at 9, the aperture being preferably aligned with, and of equal diameter to the bore of the spindle.

The carrier is further provided with a series of radial slots 11, which are preferably curved as to the sides at 14, the inner edges converging at 15 and in these slots are seated frusto conical rollers 12 of such diameter as to prevent their passage through the converging portions of the slot at 15. These rollers, as shown, are so tapered that their outer elements bearing against the frusto conical surface 3, their inner elements are parallel to the axis of the spindle, and they are preferably of reduced diameter or undercut centrally at 16 and, therefore, provided with spaced bearing surfaces 17 and 18 near the opposite ends which engage respectively the frusto conical internal surface 3 of the spindle or chuck body and any member of a diameter approaching the diameter of the bore 2 which may be inserted in the chuck opening 9.

The outer cylindrical surface 28 of the spindle is preferably ground with extreme accuracy to a cylindrical contour, the frusto conical internal surface 3 being ground concentrically with said cylindrical surface and with conical bearing surface 19. The extreme accuracy of the chuck results from the concentricity of surfaces 3 and 19 and from the uniformity of dimension and spacing of the rollers 12.

The spindle may be mounted, as shown, in a bearing sleeve 20 having a tapered internal surface 21 to engage the external tapered surface 19 on the spindle and the bearing sleeve is provided with an opposite internal taper at 22 to be engaged by a tapered conical sleeve 25 mounted to slide on the spindle. This conical member is preferably thrust inwardly against the bearing surface by means of a helical spring 26 which bears at one end against a cone and at the other end against a gear 27 on the spindle. The spindle described is for valve resurfacing, to which art the invention is not necessarily confined.

In operation, a valve stem or other member to be held by the chuck is inserted through the opening 9 in the carrier through which it may extend into the bore 2 of the spindle and the nut or cap 6 is tightened, being turned up on the thread or other closing means 5, forcing the carrier 7 which is secured to the cap into the frusto conical opening 3, the slots 11 being provided with abutments 30 at their lower ends forcing the conical rollers backward toward the smaller end of the opening 3 and along the inclined surface thereof. The reduction in the diameter of the internal cone 3, or the inclination of the surface, forces the rollers inwardly, maintaining their inner elements, which project through the slots into the opening, parallel to each other and parallel to the walls of the bore 2 and the axis of the spindle. These inwardly projecting parallel elements constitute the gripping means of the invention. The bearing surfaces 17 and 18 are preferably spaced as shown.

The spaced surfaces or the elongated lines of contact engaging the valve stem or other member thrust into the chuck from three sides, there being preferably three rollers, tend to center and align it with the axis of the spindle, giving automatically an exact alignment of the valve, or other member held, with the axis of the spindle without the necessity for the expenditure of time or the exercise of skill.

The chuck, as constructed, gives increased accuracy of positioning of the member held, clamping it on exact center and in alignment with the axis of the spindle. It further dispenses with the chance of inaccuracy due to the mounting of the chuck body on a tapered spindle end. The chuck is also of extreme simplicity as compared to the majority of chucks now on the market and can be produced cheaply in large quantities.

I have thus described specifically and in detail a single embodiment of my invention in order that the nature and operation of the same may be clearly understood, however, the specific terms herein are used descriptively rather than in a limiting sense, the scope of the invention being defined in the claims.

What I claim as new and desire to secure by Letters Patent is:

1. The combination with a spindle having a central passage and a tapered enlargement of said passage at the chuck end, said chuck end being externally threaded, a threaded cap engaging the threaded end of the spindle and having a frusto conical tapered carrier with a central axial bore, said carrier projecting into the conical opening in the spindle and being connected to the cap to rotate therewith, said carrier being slotted radially from the outer conical surface to the bore, and a plurality of tapered rollers of circular cross-section in said slots having their outer elements engaging the inner conical surface of the spindle and the inner elements parallel to the walls of the spindle bore projecting inwardly through said slots and constituting gripping means.

2. A chuck body having a frusto-conical internal bearing surface, a threaded chuck operating member rotatable relatively to the chuck body which has a corresponding thread, tapered rollers of circular cross-section mounted in the threaded member to rotate therewith and to rotate relatively thereto about their respective axes, said rollers bearing as to their outer elements against the frusto-conical bearing surface, and having their inner elements parallel.

Signed by me at Towson, Maryland, this 14th day of June, 1927.

JOHN EDWARD GRAVES.